Aug. 4, 1959 G. M. CLARKE 2,898,507

ELECTRIC TRAVELLING WAVE AMPLIFIERS

Filed Aug. 13, 1954

INVENTOR
GRAHAM MORLEY CLARKE
BY
[signature]
ATTORNEY

United States Patent Office 2,898,507

Patented Aug. 4, 1959

2,898,507

ELECTRIC TRAVELLING WAVE AMPLIFIERS

Graham Morley Clarke, London, England, assignor to The M. O. Valve Company Limited, London, England Application August 13, 1954, Serial No. 449,560

Claims priority, application Great Britain August 14, 1953

10 Claims. (Cl. 315—3.6)

Figure 1:
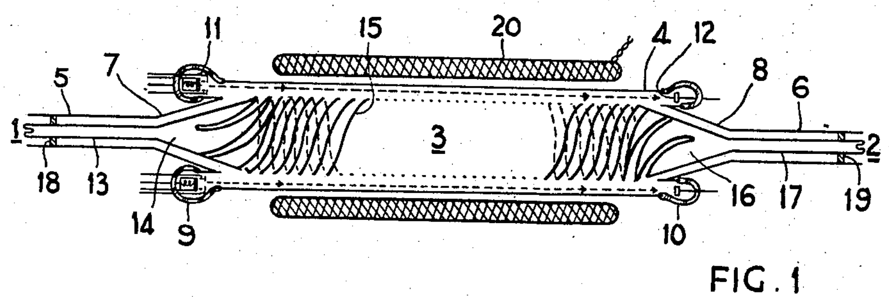

This invention relates to electric travelling wave amplifiers of the kind including a helix of conducting material, input means for exciting an electric wave at one end of said helix, output means for extracting said wave from the helix after it has travelled along the helix, and means for causing an electron stream to flow within or adjacent to the helix with a component along the axis of the helix whose speed is substantially equal to the speed with which a component of the electric field progresses along the axis, so that said wave is amplified on its passage between the input and output means by interaction with the electron stream.

In such amplifiers the helix serves as a retarding means for producing from the electric wave, which travels round the turns of the helix at substantially the speed of light, an axially progressing electric field whose axial speed is much less, approximately in the ratio of the length of one turn of the helix divided by the pitch of the helix, and can be matched to that of an electron stream of practicable electron volts energy for producing the required interaction and amplification of the electric wave.

Such amplifiers have the advantage over conventional thermionic valve and klystron amplifiers that they are substantially independent of electron transit time effects and can be used for amplifying electrical oscillations of very high frequency. It has also been found with known travelling wave amplifiers that an approximately constant gain over a relatively wide band of frequencies can be obtained provided that the shortest free-space wavelength in the band is large compared with the length of two turns of the helix. If, however, at the higher frequencies in the band over which the amplifier is required to operate the wavelength approaches that of the length of two turns of the helix it is necessary to include attenuation on the helix to avoid self-oscillation resulting from the presence of backward travelling components of the electric field which appear with similar amplitudes to the forward travelling components under these conditions, and this causes the gain to fall off at the higher frequencies in the band.

This constitutes a serious limitation in practice, since travelling wave amplifiers are mainly of interest for use at very high frequencies, for example free-space wavelengths of 10 centimetres or less, and the formation of a helix with each length of 10 centimetres wound into many more than two turns implies a very small diameter for the helix, making the construction of the amplifier very difficult both mechanically and electrically. In addition it is often desirable to make the diameter of the helix as large as possible, for example to enable a given gain to be obtained with as short a length of helix as possible, by means of a large electric current passing near the helix, or, with amplifiers for operating at high power, to permit the use of a heavy gauge conductor or water-cooled tubing for the helix.

The object of the present invention is to provide a form of travelling wave amplifier which is less subject to these difficulties.

According to the invention in an electric travelling wave amplifier of the kind specified the helix is formed as a multi-start helix comprising a plurality of similar coaxial helices with interleaved turns, which helices are all electrically symmetrically associated with the input and output means.

In the operation of a travelling wave amplifier in accordance with the invention, the phase of the wave at any point on any one helix is intermediate between the phase of the wave at those points on the adjacent helices which lie on a straight line through the said point and parallel to the common axis of the helices; thus at the frequency at which each individual helix has 2 turns per wavelength, the resultant electric field produced is the same as that obtained with a single helix having $2n$ turns per wavelength, where $n$ is the number of interlaced helices in the multi-start helix, and the occurrence of the undesirable standing wave field pattern at the said frequency is thereby avoided.

In principle, the greater is $n$ the greater is the advantage obtained by the arrangement in accordance with the invention, but in practice it will usually only be possible for $n$ to be a small integer.

Thus in the design of a travelling wave amplifier in accordance with the invention, the operating voltage will usually first be fixed, the diameter of the multi-start helix is then chosen to allow the desired current to flow and the pitch of the individual helices is chosen to obtain the correct velocity for the electric field; the multi-start helix is then provided with as many individual helices as will interlace within this pitch consistent with adequate thickness of the conductors forming the helices and with the turns not being too closely spaced to pass the required power without voltage breakdown between adjacent turns.

Preferably the individual helices are all formed at each end as continuations of a cylindrical or conical conductor which at one end of the multi-start helix forms or merges into one conductor of a coaxial line constituting part of the input means, and along which the input wave is arranged to be launched, and at the other end of the multi-start helix forms or merges into one conductor of a coaxial line forming part of the output means for extracting the amplified wave. The transition from the conductor to the individual heilces is preferably effected by slots in the conductor which start parallel to its axis and are continued in a gradual curve around the surface of the conductor until the parts of the conductor between adjacent turns of the slots assume the forms of the required helices; preferably the slots starting the different helices are evenly spaced around the axis, and the helices are preferably evently interleaved at least over the part of their axial length over which interaction with the electron stream is arranged to occur.

If waveguide input and output means are required, the said coaxial lines may be coupled to the waveguides by crossed waveguide to coaxial line transfer arrangements.

Figures 2, 3:
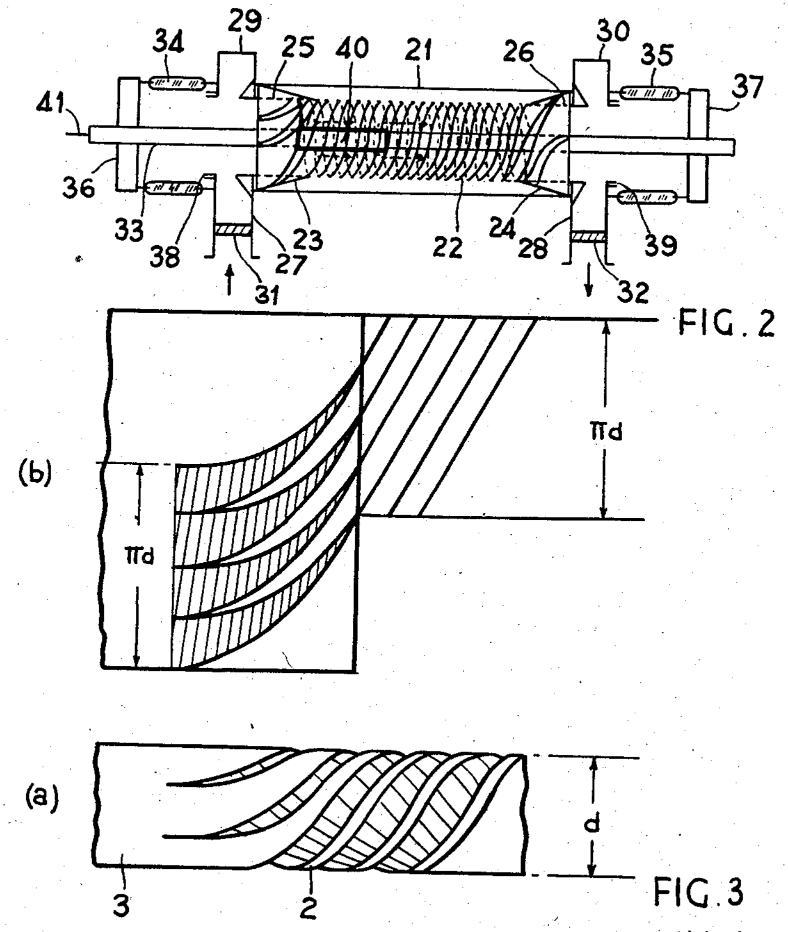

The invention will be further described by way of example with reference to the accompanying schematic drawings in which:

Figure 1 shows a part-sectional plan view of a travelling wave amplifier in accordance with the invention in which an electron stream is projected in a direction parallel to the axis from an electron gun at one end of the multi-start helix to a collector electrode at the other end, Figure 2 shows a part-sectional plan view of a different form of travelling wave amplifier in accordance with the invention in which an electron emissive cathode extends along the axis of the multiple helix, an electrostatic field is maintained between the helix and the cathode, and the electron stream from the cathode is given an axial component of velocity by a circular magnetic field established around the cathode by the passage of an electric current through the cathode conductor, Figure 3($a$) is an enlarged side view of the termination of one end of the multi-start helix shown in Figure 2, and Figure 3($b$) is a developed view of the portion of the multi-start helix shown in Figure 3($a$).

Referring now to Figure 1, the amplifier is of a straight-through coaxial line nature formed essentially in three sections, namely an input section 1, an amplifying section 2, and an output section 3.

The outer conductor 4 of the amplifying section is of greater diameter than the outer conductors 5 and 6 of the input and output sections, which are of the same diameter as each other, and is united with the conically flared ends 7 and 8 of these outer conductors through annular glass seals 9 and 10 respectively. These glass seals form annular pockets in which, at the input end, is located an annular electron gun arrangement 11, and at the output end is located an annular collector electrode 12, leads to which are sealed through the bottoms of the glass pockets. The latter together with the gun 11 and electrode 12 have been indicated schematically, and in section rather than in plan view, in order to indicate them more clearly, and also so as not to obscure the details of the helix slot transitions.

The inner conductor 13 of the input section is flared outwardly within the flared part 7 of the outer conductor 5 to form a hollow cone 14 which is slotted by four slots which start parallel to the axis and evenly spaced round it, and curve round at a gradually increasing angle to the axis until they are transformed into a multi-start helix 15 comprising four similar coaxial helices having interlaced turns; the multi-start helix 15 extends close to the outer conductor 4 over the greater part of the length thereof. At the output end there takes place the reverse transition of the multi-start helix into four slots parallel to the axis of the flared end 16 of the inner conductor 17 of the output section 6. If required, stiffening supports (not shown) of insulating material, such as glass, may extend between the conical ends of the multi-start helix parallel to its axis.

The composite inner conductor (13, 14, 15, 16, 17) is supported from the outer conductor by means including insulating bushings 18 and 19 which hermetically seal the space within the composite outer conductor, the outer ends of the conductors 13 and 17 being solid or themselves hermetically sealed.

The outer conductor 4 is of non-magnetic material and is surrounded by a solenoid 20 by means of which an annular stream of electrons issuing from the electron gun 11, and flowing to the collector electrode 12 in operation of the device, can be maintained as an annular sheet flowing in the space between the multi-start helix 15 and the outer conductor 4, as indicated by the dotted lines bearing arrows.

An input wave fed into the input section 1 flows round the multi-start helix 15, is amplified by interaction with the electron stream in the amplifying section 3, and the amplified wave flows out through the output section 2.

If the inner conductor 17 of the output section 2 is hollow, then in order to avoid the possibility of power from the amplified wave being fed down this inner section, its diameter should be smaller than the cut-off diameter of the equivalent circular waveguide at the highest frequency at which the amplifier is required to operate.

Referring now to Figure 2, in this form of amplifier the amplifying section comprises a cylindrical metal tube 21 within which is coaxially supported the multi-start helix 22, which is again a four-start helix; at each end the helix is terminated by a four slot transition into a conical conductor, 23 at the input end and 24 at the output end, which conical conductors serve to provide gradual closures of the coaxial lines formed by the helix 22 as inner and conductor 21 as outer. The helix may again be stiffened by the use of insulating rods (not shown) if required. The conductors 23 and 24 support within them coaxial conductors 25 and 26, which also effectively form four-slot transition continuations of the helix 22.

At the input end the conductor 25 extends into a rectangular input waveguide 27 the mean plane of which extends at right angles to the axis of the helix 22, and at the output end the conductor 26 extends into a similar rectangular output waveguide 28. The stub ends 29 and 30 of the waveguides are closed and the open ends of the waveguides are sealed by glass window seals 31 and 32 respectively.

Along the common axis of the conductor 21 and helix 22 passes coaxially a metal conductor 33 (possibly water cooled internally) which is supported from the waveguides 27 and 28 by glass sleeves 34 and 35 sealed at one end to a ring flange on the side of the waveguide and at the other end to a metal collar 36 or 37 sealed to the conductor 33. The latter passes through apertures in the side walls of the waveguides, which apertures are surrounded by annular recesses constituting chokes 38 and 39 of critical length adjusted in combination with the position of the closures 29 and 30 to provide a high impedance against the escape through the apertures of power fed into the waveguide 27 in the direction of the corresponding arrow, and power extracted from the waveguide 28 in the direction of the arrow indicated in conjunction therewith. This arrangement is designed for obtaining matching of the input wave into the device with little reflection, and vice versa at the output end. Alternatively, however, instead of the chokes 38 and 39 there may be used at each end of the device a conducting plate which extends radially from the conductor 33 across the corresponding aperture in the side wall of the input or output waveguide and is spaced from said aperture, in a direction away from the helix, at a distance which is small compared with the wavelength of the oscillations to be amplified yet not so small that it appreciably increases the capacity between the conductor 33 and the waveguide at that end; such an arrangement is, in fact, superior to the use of chokes in respect of the bandwidth over which the device is arranged to amplify. In either case, the conductor 33 forms with the conductors 25 and 26 coaxial lines through which the helix 22 is coupled to the input waveguide 27 and output waveguide 28.

Within the helix 22 the conductor 33 is coated with electron emissive material for about the first half of the length of the helix, and within the conductor 33 at this coated region 40 is provided a heater, one lead 41 to which is shown emerging from the conductor, which itself provides the other heater lead.

The space within the assembly is, of course, highly evacuated, the sealed exhaust aperture not being shown in the drawing.

In operation of this embodiment of the invention, a D.C. potential is applied between the conductor 33 and helix 22, preferably with the latter at earth potential, and the heater within the conductor 33 is energised; a direct current is passed through the conductor to create a circular magnet field around the conductor which causes electrons drawn from the cathode 40 towards the helix 22 under the high D.C. potenital to progress along the axis of the helix, as indicated by the dotted lines bearing arrows.

The electrostatic field may in some cases be applied in pulses and then the current in the conductor 33 may also be pulsed (which is difficult in practice) or supplied with sinusoidal current in synchronism with the pulses.

The input wave fed into the input waveguide 27 is then amplified by interaction with these electrons on flowing round the multi-start helix 22 and the amplified wave emerges from the output waveguide 28.

It should be noted that the mean circumference of the coaxial line formed by the conductor 33 and conductors 25 and 26 at the input and output end respectively should be less than the shortest operating wavelength to prevent the appearance of "waveguide" modes along the helix which have periodic azimuthal variations and which would react inefficiently with the electron stream.

Figure 3 shows in more detail at (*a*) the nature of the transition from the helix 22 to the conductor 25, the transition at the other end being similar, and at (*b*) how the slots would appear if the cylinder were rolled out into a flat sheet.

The conical transition shown in Figure 1 (as well as that between the helix 22 and conductors 23, 24 in Figure 2) is similar, but on rolling out into a flat sheet there is formed a sector of a circle instead of a rectangle.

It will be appreciated that the invention is not limited in application to the two forms of amplifiers illustrated, but may be applied in other forms, for example in amplifiers comprising two concentric helices, of which one is of larger diameter than the other and the arrangement is such that the electron stream passes between them; in such an amplifier each of these helices may be formed as a multi-start helix in accordance with the invention.

I claim:

1. An electric travelling wave amplifier including a helix of conducting material, input means for exciting an electric wave at one end of the helix, output means for extracting the wave from the helix after it has travelled along the helix, and means for causing an electron stream to flow adjacent to the helix for interaction with an axially progressing component of the electric wave for amplification of the wave, wherein the helix is formed as a multi-start helix comprising several similarly wound coaxial helices of the same radius and pitch arranged with interleaved discrete turns, which helices are all electrically symmetrically associated with the input and output means so that the phase of the wave at any point on any one helix is intermediate between the phase of the wave at those points on the adjacent helices which lie on a straight line through the said point and parallel to the common axis of said helices.

2. An electric traveling wave amplifier according to claim 1 wherein the individual helices of the multi-start helix are all formed at each end as continuations of a conductor having the form of a surface of revolution which at one end of the multi-start helix merges into one conductor of a coaxial line constituting part of the input means, and at the other end of the multi-start helix merges into one conductor of a coaxial line constituting part of the output means.

3. An electric travelling wave amplifier according to claim 2 wherein at each end of the multi-start helix the transition from the individual helices to the conductor is effected by slots formed in a hollow conductor, which slots curve round the surface of the conductor until at a progressively increasing angle to the axis and with the sides of the slots diverging the parts of the conductor between the slots assume the forms of the required helices.

4. An electric travelling wave amplifier according to claim 3 wherein the slots are evenly spaced around the axis and the helices are evenly interlaced at least over the part of their length over which interaction with the electron stream is arranged to occur.

5. An electric travelling wave amplifier according to claim 3 wherein the input and output means each consists of a concentric line and at each end of the helix the said slotted hollow conductor constitutes a continuation of the inner conductor of the corresponding concentric line.

6. An electric travelling wave amplifier according to claim 5 wherein the means for producing an electron stream comprises an annular electron gun arranged around the helix for producing an annular stream of electrons flowing adjacent to the outer surface of the helix and parallel to its axis.

7. An electric travelling wave amplifier according to claim 3 wherein the input and output means each includes a waveguide which extends transverse to the axis of the helix and from which the corresponding one of said conductors at the ends of the helix is branched off.

8. An electric travelling wave amplifier according to claim 7 wherein the means for generating an axially flowing electron stream comprises a conductor coaxial with the helix and coated with electron emissive material within the helix, a heater for rendering said material emissive, means for establishing a radial electric field between said conductor and the helix for drawing towards the helix a stream of electrons from said emissive material, and means for passing an unidirectional electric current through said conductor for establishing a circular magnetic field around said conductor for imparting an axial component of flow to the said stream of electrons.

9. An electric travelling wave amplifier including a helix of conducting material, input means for exciting an electric wave at one end of the helix, output means for extracting the wave from the helix after it has travelled along the helix, and means for causing an electron stream to flow adjacent to the helix for interaction with an axially progressing component of the electric wave for amplification of the wave, wherein the helix is formed as a multi-start helix comprising several similarly wound coaxial helices of the same radius and pitch arranged with interleaved discrete turns that at one end of the multi-start helix are joined into a single conductor and at the other end of the multi-start helix are joined into another single conductor, said similar coaxial helices being electrically symmetrically associated with the input and output means so that the phase of the wave at any point on any one helix is intermediate between the phase of the wave at those points on the adjacent helices which lie on a straight line through the said point and parallel to the common axis of said helices.

10. An electric travelling wave amplifier according to claim 9, wherein there are at least four similar coaxial helices in the multi-start helix.

References Cited in the file of this patent

UNITED STATES PATENTS

| | | |
|---|---|---|
| 2,122,538 | Potter | July 5, 1938 |
| 2,637,775 | Lund | May 5, 1953 |
| 2,725,499 | Field | Nov. 29, 1955 |
| 2,761,088 | Warnecke et al. | Aug. 28, 1956 |
| 2,768,322 | Fletcher | Oct. 23, 1956 |
| 2,774,005 | Kazan | Dec. 11, 1956 |
| 2,789,247 | Jonker | Apr. 16, 1957 |

FOREIGN PATENTS

| | | |
|---|---|---|
| 668,017 | Great Britain | Mar. 11, 1952 |